United States Patent Office 2,914,530
Patented Nov. 24, 1959

2,914,530

THIOPHOSPHORIC ACID ESTERS AND THEIR PRODUCTION

Gerhard Schrader, Wuppertal-Cronenberg, and Walter Lorenz, Wuppertal-Elberfeld, Germany, assignors to Farbenfabriken Bayer Aktiengesellschaft, Leverkusen, Germany, a corporation of Germany No Drawing. Application May 28, 1957
Serial No. 662,014

Claims priority, application Germany June 15, 1956

6 Claims. (Cl. 260—248)

This invention relates to and has as its objects new and useful thiophosphoric acid esters and their preparation. Generally the new esters may be represented by the following formula

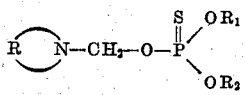

in which R stands for a group of atoms which are necessary to complete a nitrogen containing heterocyclic ring system, and $R_1$ and $R_2$ stand for alkyl radicals.

Thionophosphoric acid esters have become known and important insecticides during the last years, and in many plant protecting agents thiophosphoric acid esters are the active ingredients for protection against aphids, mites and the like. In the class of the above shown compounds there has been done also considerable work, and some thiol- or thiolthiono analogues of the above type are already known as commercial insecticides.

It has now been found that very effective compounds in the class of phosphorus insecticides correspond to the above shown formula. More especially in this formula

stands for such residues as succinimide, thiodiglycol imide, phthalimide, tetrahydro phthalimide, hexahydro phthalimide, benzazimide, 2-mercapto benzothioazol, benzotriazol, and the like. As it is to be seen from these examples a common property of that class of compounds is the presence of one or more further nitrogen atoms in the ring system or the presence of one or more carbonyl- or thiacarbonyl-groups in said system. As it is to be seen from the description following below the compounds must furthermore be able to produce N-methylol compounds by Mannich-Addition.

The preparation of the inventive compounds proceeds to generally known processes and may be carried out e.g. by reacting these above said cyclic N-methylol compounds (Mannich Adducts of the above said heterocyclic systems) with dialkyl phosphite chlorides in the presence of acid-binding agents, and by subsequent addition of sulfur to the intermediate trialkyl phosphites. This reaction is to be seen from the following formula using N-methylol benzazimide and diethylphosphite chloride as starting material

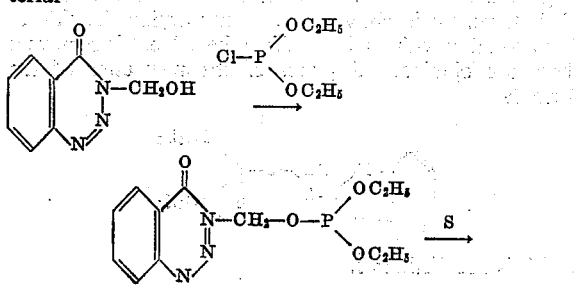

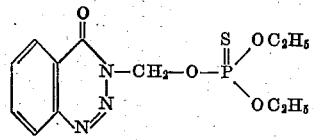

The preparation of the N-methylol compounds is known from the literature. The above shown N-methylol benzazimide for instance may be prepared according to U.S. Patent No. 2,758,115.

The reaction of the N-methylol compounds with the dialkylphosphite chlorides generally takes place at temperatures from about 20 to about 60° C., especially at slightly elevated temperatures from about 20 to about 40° C. The intermediate dialkylphosphites of the N-methylol compounds are mostly unstable and therefore they are further reacted with sulfur without isolating them. The second step, i.e. the addition of sulfur to the phosphites, may optionally be carried out at temperatures from about 50 to about 150° C., especially at temperatures from about 60 to about 90° C.

Advantageously the inventive compounds are prepared in the presence of inert solvents such as lower aliphatic ketones, e.g. acetone or methyl ethyl ketone, or in liquid hydrocarbons, such as benzene, chlorobenzene, toluene, xylene and the like. In some cases also dimethyl formamide may be used.

Acid-binding agents which are necessary to split off hydrogen chloride are especially such ones, which are soluble in the above mentioned inert solvents; thus organic amines such as pyridine, triethyl amine or dimethyl aniline are especially suitable in the preparation of the inventive compounds.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i.e. in dilution or solution with solid or liquid carriers such as chalk, talc, bentonite, water, alcohols, liquid hydrocarbons, etc. The inventive compounds may further be used in combination with other known insecticides or pesticides, etc.

Effective concentrations of the compounds may vary also; generally concentrations of 0.0001% to 1.0% kill pests effectively. The combinations of the compounds may be sprayed or dusted or otherwise brought in contact with pests or plants to be protected. They may also be used as aerosols.

As a special example for the utility of the inventive compounds 0.0-diethyl-0-(benzazimido-methyl)-thionophosphate has been tested against black bean aphids. A 100% killing is obtained by spraying on infected black beans a 0.001% aqueous solution of the active compound. The aqueous solution has been prepared by adding the same amount of dimethyl formamide to the active ingredient, then adding 50% by weight (referred to active ingredient) of a commercial emulsifier based on a benzyl-hydroxydiphenyl polyglycol ether and at last diluting this to a concentration of 0.001 active ingredient with water.

The following examples are given by way of illustration only, without limiting the present invention thereto.

Example 1

80 grams of benzazimide methylol of the formula

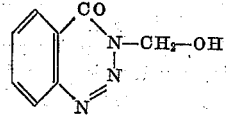

(M.P.) 134°) are dissolved in 300 cc. of dimethyl formamide together with 42 grams of pyridine. There are added while stirring and conducting nitrogen in the reaction tube at a temperature of about 20° C. 80 grams of diethyl phosphoric acid monochloride (B.P.$_{12}$ 39 to 40° C.), which has been dissolved in 50 cc. of benzene. While cooling the reaction temperature is kept at about 30° C. After completion of the reaction there are added at once at a temperature of about 30° C. 16 grams of finely powdered sulfur. The reaction temperature rises to about 60° C. and is kept for further 20 minutes at about 70° C., then cooled to room temperature and at last the reaction product is poured into 500 cc. of water, to which 20 cc. of diluted hydrochloric acid were added. The separated oil is taken up in chloroform, washed with a 3% sodium bicarbonate solution and dried over sodium sulfate. After distilling off the solvent where are obtained 110 grams of a slightly yellow colored water-insoluble oil, which is not even distillable in high vacuo. The new ester shows a LD$_{50}$ of 50 mg./kg. on the rat orally.

*Analysis.*—Calc. for mol weight 329: S, 9.7%; P, 9.4%; N, 12.8%. Found: S, 9.3%; P, 8.9%; N, 12.7%.

Aqueous emulsions containing 0.001% of this ester kill black bean aphids and spider mites 100%.

By the same method, but using dimethyl phosphoric acid monochloride or dipropyl phosphoric acid monochloride there are obtained the corresponding dimethyl- and dipropylesters.

*Example 2*

32 grams of N-methylol succinimide of the formula

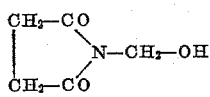

M.P. 62° C.) are suspended in 120 cc. of toluene and there are added 21 grams of pyridine. The N-methylol compound solubilizes. While conducting nitrogen continuously through the reaction mixture there are added at a temperature of about 30° C. within 20 minutes 40 grams of diethyl phosphoric acid monochloride, which have been diluted with 40 cc. of toluene. The temperature is kept at 30° C. by external cooling. After completion of the reaction there are added at once 8 grams of sulfur. The temperature rises to about 55° C. and is kept for further half an hour at 70° C. Then the reaction product is poured into 200 cc. of water, to which have been added 10 cc. of diluted hydrochloric acid. The toluene layer is separated, washed with a 3% sodium bicarbonate solution, dried over sodium sulfate and then fractionated. There are obtained 25 grams of the new ester (B.P.$_{0.01}$ 135 to 136° C.).

*Analysis.*—Calc. for mol weight 281: N, 4.9%; S, 11.3%; P, 10.9%. Found: N, 4.7%; S, 10.85%; P, 11.2%.

Aqueous solutions containing 0.0005% of this ester, kill black bean aphids and spider mites 100%.

*Example 3*

45 grams of phthalimide methylol of the following formula

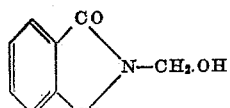

(M.P. 142° C.) are dissolved in 150 cc. of methylethyl ketone. There are added 21 grams of pyridine and 40 grams of diethyl phosphoric acid chloride which has been diluted with 40 cc. of toluene while stirring in a nitrogen stream. After completion of the reaction there are added 8 grams of sulfur and the reaction product is kept for half an hour at 70° C. After cooling down to room temperature the reaction product is poured into 300 cc. of water and the water-insoluble oil is taken up in ether. After separating the etherical layer and drying it over sodium sulfate the solvent is removed. There are obtained 53 grams of the new ester of the following formula

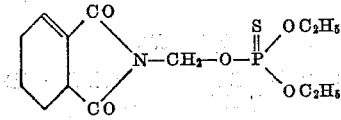

The ester is slightly water-soluble. Even in high vacuo it is not distillable. 0.001% aqueous solutions kill black bean aphids 100%.

*Example 4*

38 grams of the methylol compound of benzotriazol of the following formula

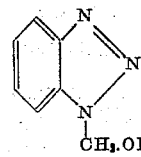

(M.P. 151° C.) are dissolved in 100 cc. of dimethyl formamide. There are added 21 grams of pyridine and 40 grams of diethyl phosphoric acid chloride, which has been diluted with 40 cc. of toluene, while stirring in a nitrogen stream. The reaction is strongly exothermic. After completion of the reaction there are added 8 grams of sulfur and the reaction product is warmed for another half an hour at 70° C. After cooling down to room temperature the reaction product is poured into 200 cc. of water and the water-insoluble oil is taken up in chloroform. After drying the chloroform solution with sodium sulfate the solvent is removed. There are obtained 55 grams of the new ester of the following formula

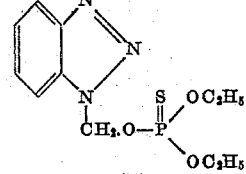

as a water-insoluble yellow oil.

0.005% solutions kill spider mites completely.

*Example 5*

50 grams of the methylol compound of 2-mercapto benzothiodiazol of the formula

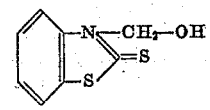

(M.P. 131° C.) are dissolved in 150 cc. of methylethyl ketone. There are added 21 grams of pyridine and 40 grams of diethyl phosphite chloride which has been diluted with 40 cc. of toluene, while stirring in a nitrogen stream. The temperature is kept at 20° C. for 20 minutes. After completion of the reaction there are added 8 grams of sulfur, the temperature rises to about 60° C. and is kept for further 1 hour at 60° to 70° C. After cooling down to room temperature the reaction product is poured into 200 cc. of water and the water-insoluble oil is taken up in chloroform. After drying the chloroform solution with sodium sulfate the solvent is removed; there are obtained 45 grams of the new ester of the formula

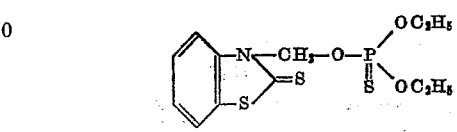

which is not distillable.

*Analysis.*—Calc. for mol weight 349; S, 27.4%; P, 8.9%; N, 4.0%. Found: S, 28.1%; P, 8.1%; N, 4.1%.

The new ester shows a LD$_{50}$ of 25 mg./kg. on rats orally.

By the same way but using instead of diethyl phosphite chloride the corresponding dimethyl- or dipropyl-compound there are obtained the esters of the formulae

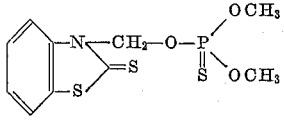

and

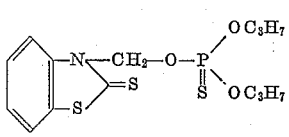

We claim:
1. Thiophosphoric acid esters of the general formula

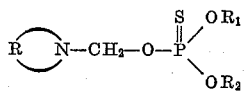

in which

is a member selected from the group consisting of N$_1$-benzazimido-, N-succinylimido-, N-phthalimido-, N$_1$-benzotriazolyl-, and N-2-mercapto-benzotriazolyl-radicals, and R$_1$ and R$_2$ stand for lower alkyl radicals.

2. A compound of the formula

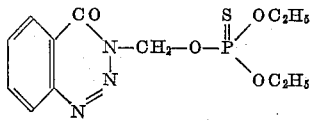

3. A compound of the formula

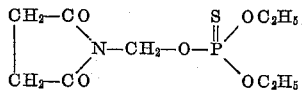

4. A compound of the formula

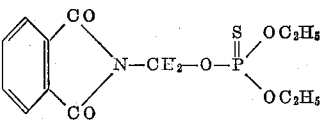

5. A compound of the formula

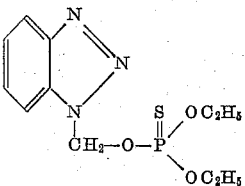

6. A compound of the formula

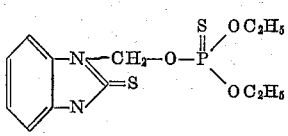

References Cited in the file of this patent

UNITED STATES PATENTS

| | | |
|---|---|---|
| 2,447,715 | Rose | Aug. 24, 1948 |
| 2,644,002 | Hoegberg | June 30, 1953 |
| 2,736,726 | Gaetzi et al. | Feb. 28, 1956 |
| 2,758,115 | Lorenz | Aug. 7, 1956 |
| 2,767,194 | Fancher | Oct. 16, 1956 |

FOREIGN PATENTS

| | | |
|---|---|---|
| 927,270 | Germany | May 2, 1955 |
| 930,446 | Germany | July 18, 1955 |
| 933,627 | Germany | Sept. 29, 1955 |
| 713,278 | Great Britain | Aug. 11, 1954 |

OTHER REFERENCES

Kosolapoff: Organo-phosphorous Compounds, John Wiley and Sons (1950), page 196.

UNITED STATES PATENT OFFICE
Certificate of Correction

Patent No. 2,914,530　　　　　　　　　　　　　　　　　November 24, 1959

Gerhard Schrader et al.

It is hereby certified that error appears in the printed specification of the above numbered patent requiring correction and that the said Letters Patent should read as corrected below.

Column 4, lines 4 to 8, the formula should appear as shown below instead of as in the patent:

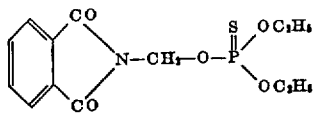

lines 50 to 54, the formula should appear as shown below instead of as in the patent:

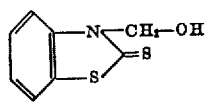

column 6, lines 21 to 25, the formula should appear as shown below instead of as in the patent:

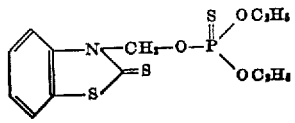

Signed and sealed this 11th day of October 1960.

[SEAL]

Attest:
KARL H. AXLINE,
*Attesting Officer.*

ROBERT C. WATSON,
*Commissioner of Patents.*